June 17, 1969  E. DE CHRISTOPHER  3,449,857
MODULAR BLOCKS WITH MATING CHANNEL STRUCTURE
Filed Nov. 14, 1967  Sheet 1 of 5
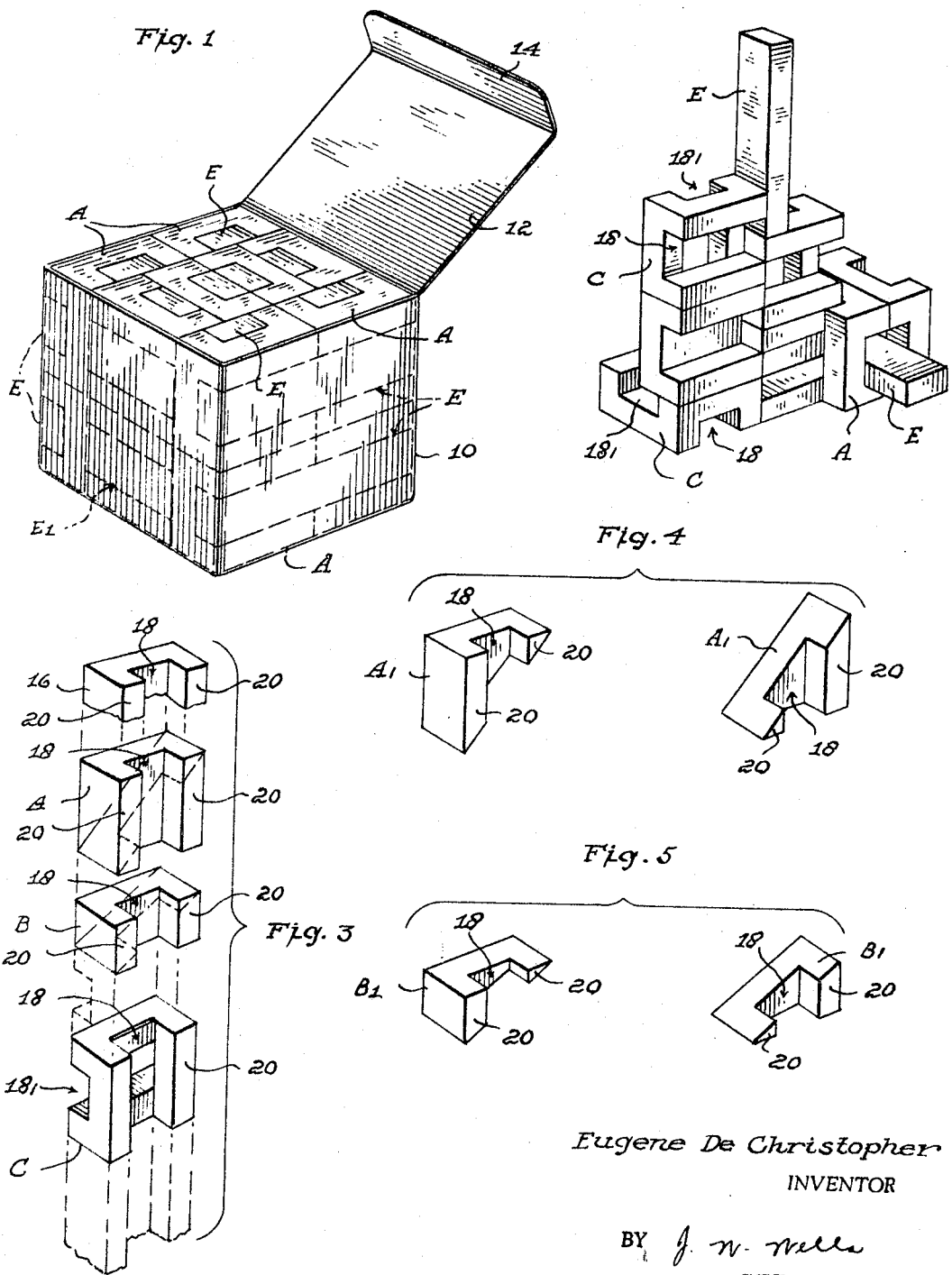
Eugene De Christopher
INVENTOR
BY J. N. Wells
ATTORNEY June 17, 1969 E. DE CHRISTOPHER 3,449,857
MODULAR BLOCKS WITH MATING CHANNEL STRUCTURE
Filed Nov. 14, 1967 Sheet 2 of 5
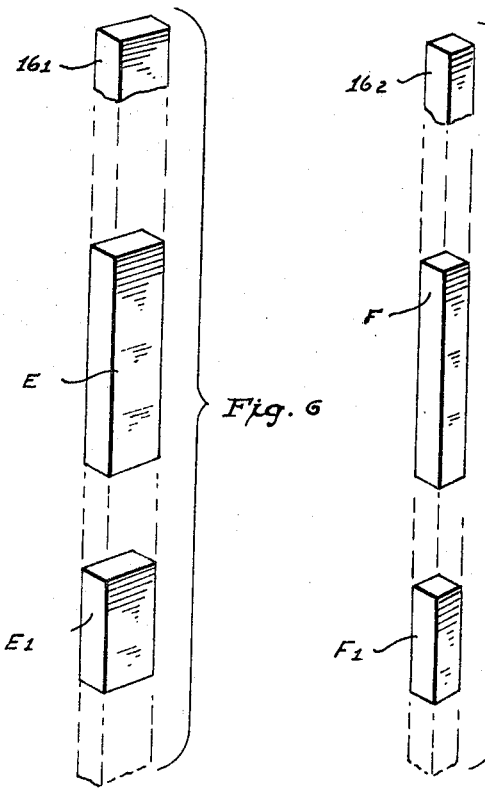
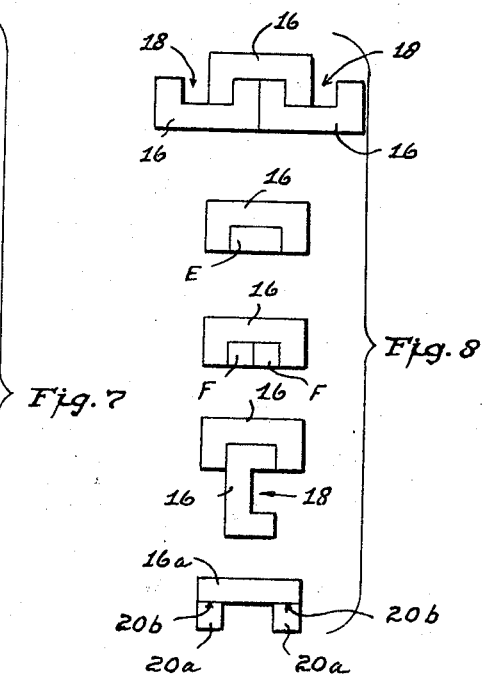
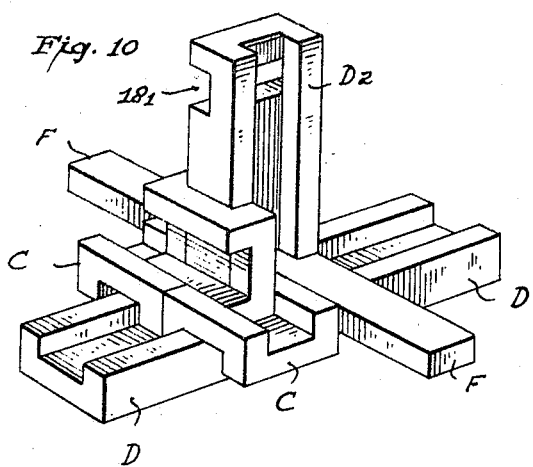
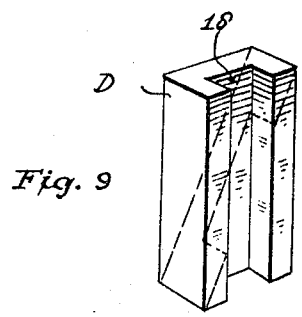
Eugene De Christopher
INVENTOR
BY
ATTORNEY

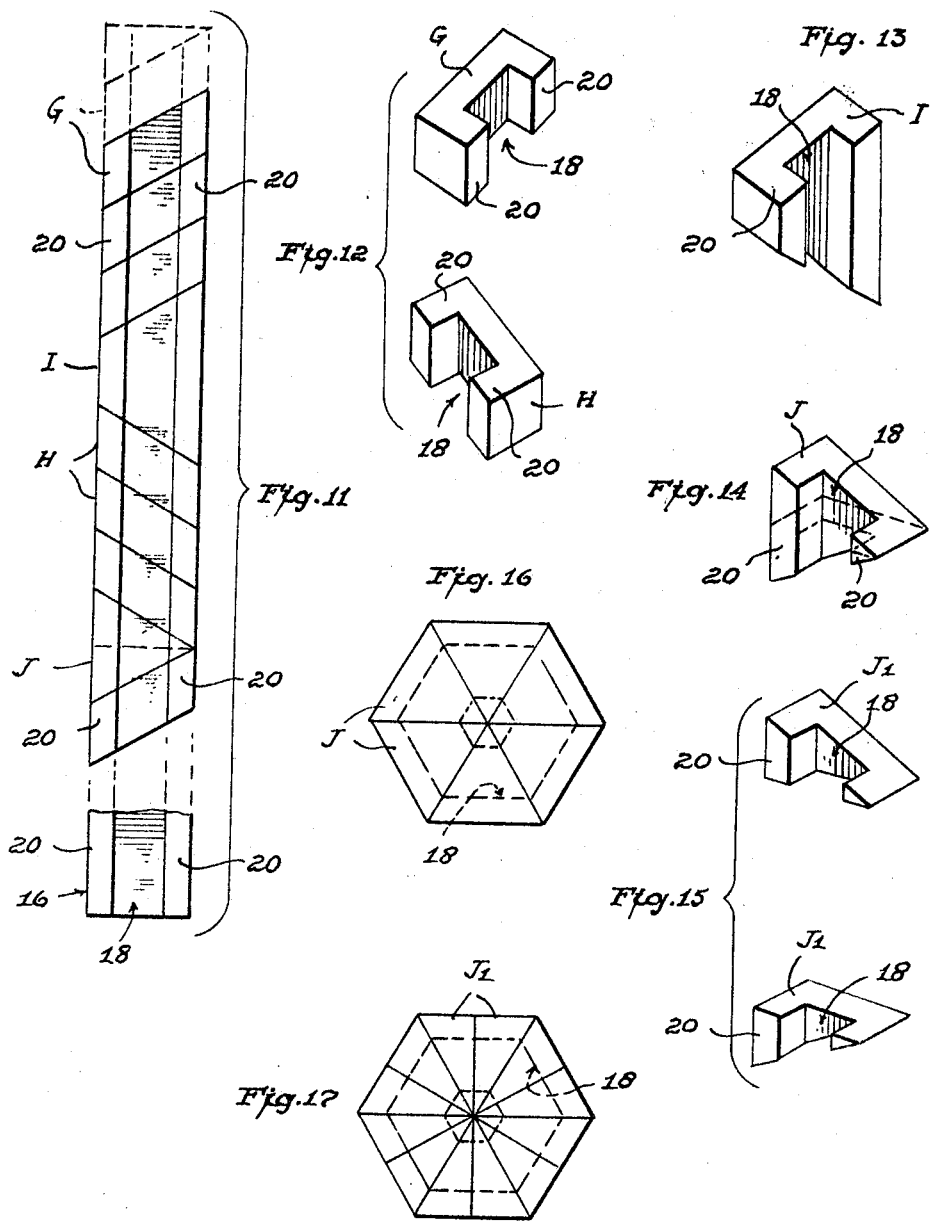

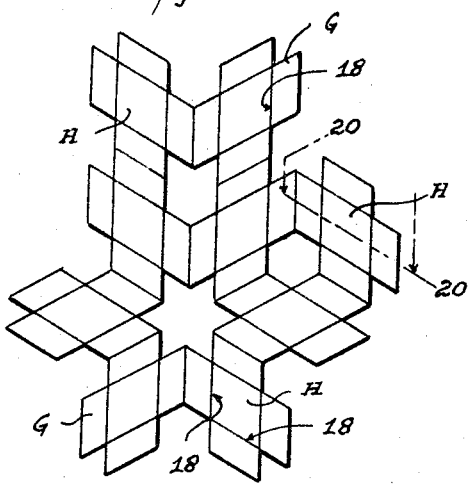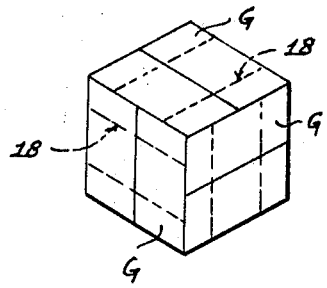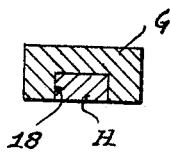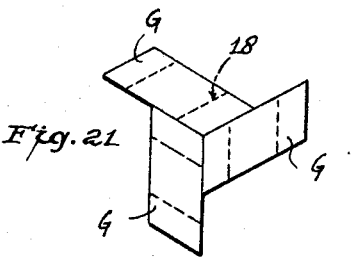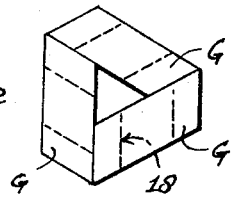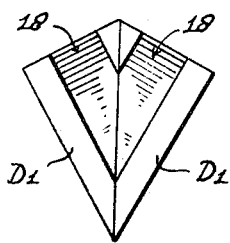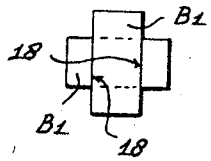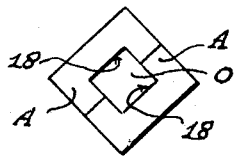

June 17, 1969 E. DE CHRISTOPHER 3,449,857
MODULAR BLOCKS WITH MATING CHANNEL STRUCTURE
Filed Nov. 14, 1967
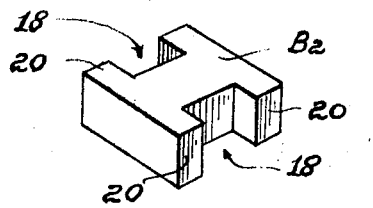
Fig. 26
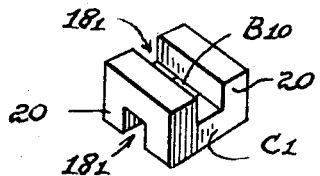
Fig. 31
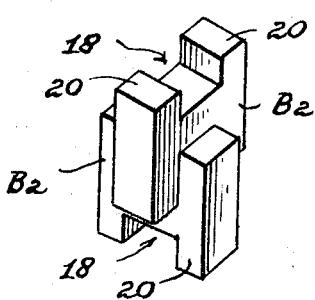
Fig. 27
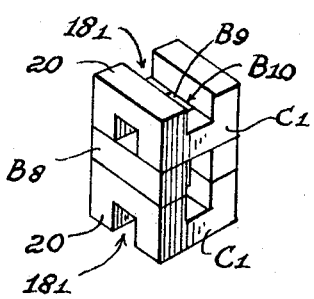
Fig. 35
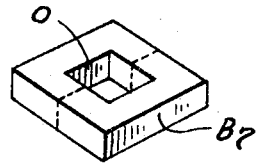
Fig. 32
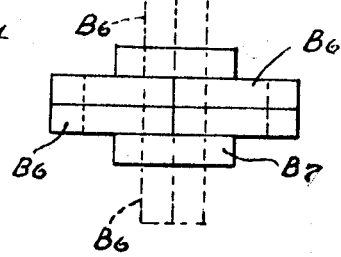
Fig. 33
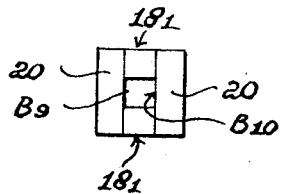
Fig. 36
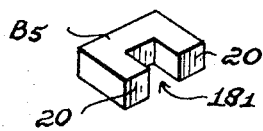
Fig. 28
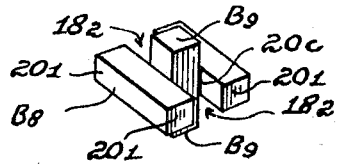
Fig. 34
Fig. 29
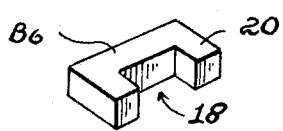
Fig. 30
Eugene De Christopher
INVENTOR.
BY J. W. Mills
ATTORNEY

United States Patent Office 3,449,857
Patented June 17, 1969

3,449,857
MODULAR BLOCKS WITH MATING
CHANNEL STRUCTURE
Eugene de Christopher, Penn Valley, Pa., assignor to
Blackstone Corporation, a corporation of New York
Continuation-in-part of application Ser. No. 459,189,
May 27, 1965. This application Nov. 14, 1967, Ser.
No. 684,899
Int. Cl. A68h 33/08; A63h 33/04
U.S. Cl. 46—25                                8 Claims

ABSTRACT OF THE DISCLOSURE

A set of modular building blocks made of wood or plastic material, including a plurality of basic interfitting blocks of various rectangular or triangular plan formations but all having rectangular central channels of equal depth on one or both sides, the side walls of the channels being of a width equal to or twice the width of certain of the channels; certain of said blocks having the channels on both sides in right angular relation, thereby forming central square through openings, and certain other of said blocks having central square perpendicular posts for interfitting insertion in corresponding square openings in other blocks of the set.

---

This invention relates to the construction of modular building blocks of the type used for amusement and educational purposes.

This is a continuation-in-part of my pending application Ser. No. 459,189, filed May 27, 1965, now abandoned.

One of the principal objects of the present invention is to provide sets of modular building blocks of simple and economical construction in various shapes and lengths, proportioned in accordance with the principle of geometric progression, so that two or more of the blocks can be easily interfitted together in the formation of a great number of specific models or structural designs.

In my improved set of modular building blocks, certain of the basic blocks of each set are of a uniform rectangular cross-sectional shape with a thickness equal to one half the width of each, and each having a central channel of uniform rectangular cross-sectional shape extending from end to end, or edge to edge, of the block on one or both sides, this channel having a depth of one fourth the width, or one half the thickness of the block and a width equal to the thickness or one half the width of the block, thereby forming parallel channel walls having a height and thickness corresponding to a square, the sides of which are equal to the depth and to one half the width of the channel, so that two of the wall portions in abutting relation can be precisely interfitted within either of said uniform channels in parallel relation therewith. The blocks may have various plan formations such, for example, as square, elongated rectangular or triangular, with the cross-sectional proportions of the blocks and the channels remaining uniform.

A set of modular blocks may include auxiliary blocks for interfitting relation within the channels of the basic blocks, such auxiliary blocks being of square cross-sectional formation equal to the depth and one half the width of the channels, or of rectangular cross-sectional formation having a thickness equal to the depth and a width equal to that of the channels. These auxiliary blocks may be coordinated in length with the basic blocks for convenience in packing a set in a container, or certain ones may be furnished in greater lengths, if desired.

In a modified form of the above described block, the central channel may be only one half the width mentioned, so that either of the opposed walls will fit closely within the channel.

Certain of the blocks having parallel channels on both sides are in the form of the letter H, with each of the central channels either double the width of each of the side walls or only equal in width to each of the walls.

A modified form of the H block mentioned may be fabricated, by molding, pinning or other suitable means, having the central rectangular area projected perpendicularly on each side of the block thereby forming axially aligned posts for insertion in corresponding openings in other blocks of a set.

Another object of the present invention is to provide a set of improved blocks which can be packed in interfitting relation in an attractive container of cubical or rectangular formation, so that the container will be precisely filled with the blocks to a plane flush with the upper edge of said container, so that the filling of the container with various interfitting combinations of the blocks may comprise an assembly project.

A further object of this invention is to provide an improved method of producing, or manufacturing, the basic channeled blocks, consisting of forming elongated bars having the required cross-sectional shape and proportions and cutting this bar into the shorter length across the channel in each bar. The cut may be at right angles across the channel to produce blocks of square or rectangular plan formation; or the cut may be obliquely across the channel to form blocks having various triangular cross-sectional shapes. The bar is preferably made of hard wood, although it may be made of plastic or any other suitable material.

The auxiliary blocks are preferably made of the same material and by the same general method used in producing the basic blocks, although only right angular cutting across a bar of the desired shape and proportions would normally be required.

It should also be understood that modular building blocks of my design may be molded from plastic material or die cast from light weight metal. Such blocks may also be formed by cementing strips of square cross-sectional shape to the longitudinal margins of a flat board to form the channels.

If desired, the blocks may be painted in various attractive colors.

Other objects and advantages of my improved modular building blocks will be apparent or pointed out in the following specification in which reference is directed to the accompanying drawings forming a part thereof, and in which:

FIG. 1 is a perspective view showing a cubical container with a set of rectilinear modular blocks of various specific formations in accordance with my invention stacked therein in interfitting relation;

FIG. 2 is a perspective view showing a number of rectilinear blocks in accordance with my invention in one form of assembled relation;

FIG. 3 is a multiple perspective view showing one manner in which some of the modular blocks shown in FIG. 1 and FIG. 2 may be produced;

FIG. 4 is a multiple perspective view showing two equilateral triangular blocks produced by the diagonal cutting of one of the square blocks illustrated in FIG. 3;

FIG. 5 is a multiple perspective view showing another of the rectilinear blocks illustrated in FIG. 3 cut into two triangular pieces;

FIG. 6 is a multiple perspective view showing one manner in which the auxiliary blocks for the interfitting relation with those shown in FIG. 3 and within the cubical container may be produced in different lengths;

FIG. 7 is a multiple perspective view similar to FIG. 6 but showing another form of auxiliary block;

FIG. 8 is a multiple end view showing the interfitting relation of the blocks shown in preceding views;

FIG. 9 is a perspective view showing one of the longer blocks which can be stacked in the cubical container shown in FIG. 1;

FIG. 10 is a perspective view showing a number of modular blocks in accordance with my invention in another form of assembled relation;

FIG. 11 is a multiple plan view showing one manner of producing triangular blocks in accordance with my invention;

FIG. 12 is a multiple perspective view showing two of the polygonal blocks shown in FIG. 11 in right and left angular relation;

FIG. 13 is a perspective view of another of the polygonal blocks shown in FIG. 11;

FIG. 14 is a perspective view of still another of the triangular blocks shown in FIG. 11;

FIG. 15 is a multiple perspective view showing the block illustrated in FIG. 14 cut into equal right and left blocks;

FIG. 16 is a plan view of six of the blocks shown in FIG. 14 assembled in a hexagonal formation;

FIG. 17 is a plan view similar to FIG. 16 but showing the blocks of FIG. 15 assembled in hexagonal formation;

FIG. 18 is a multiple plan view showing a number of the right and left polygonal blocks assembled in a symmetrical pattern;

FIG. 19 is a plan view showing a number of the blocks shown in FIG. 12 and FIG. 18 assembled in hexagonal formation;

FIG. 20 is a cross-sectional view as taken on the line 20—20 of FIG. 18 to show the interfitting relation of the blocks shown in that view;

FIGS. 21 and 22 are plan views showing polygonal patterns formed with three of the blocks shown in FIGS. 12 and 18;

FIG. 23 is a plan view showing two of the triangular blocks produced by cutting the elongated rectilinear block shown in FIG. 9 as indicated in broken lines in that view;

FIG. 24 is a plan view showing two of the blocks of the shorter design shown in FIG. 3 interfitted in the form of a right angular cross;

FIG. 25 is a plan view showing two of the square or rectangular blocks shown in FIG. 3 placed together to form a central square opening;

FIG. 26 is a perspective view, showing a block in the shape of the letter H with its thickness and the width of its opposed parallel channels double the width of each side wall;

FIG. 27 is a perspective view showing two of the blocks of FIG. 26 in one manner of interfitting relation;

FIG. 28 is a perspective view of an H block similar to FIGS. 26 and 27, but with the central channels equal to that of the side walls;

FIG. 29 is a perspective view of a block similar to B in FIG. 3 but with the central channel one-half the width thereof, or equal to the width of each side wall, and also having a thickness equal to the width of each side wall;

FIG. 30 is a perspective view of a block similar to that of FIG. 29, but with a double width central channel;

FIG. 31 is a perspective view of a block similar to C of FIG. 3, but with single width channels;

FIG. 32 is a perspective view of a square block having a thickness equal to the width of the side walls in previous views and with a central opening leaving walls corresponding in thickness to that of said side walls;

FIG. 33 is a plan view showing the manner in which blocks of FIG. 30, for example, may be interfitted in the central opening;

FIG. 34 is a perspective view showing a block similar to FIG. 28, but with the central area projected perpendicularly on each side to form posts for insertion in corresponding openings in other blocks;

FIG. 35 is a perspective view showing one of the blocks of FIG. 34 interfitted between two of the blocks of FIG. 31; and FIG. 36 is a plan view of FIG. 35.

Referring to the drawings in which like numerals designate like parts or elements in the several views, and referring first to FIGS. 1 to 10, the reference numeral 10 designates a cubical container into which a complete set of the modular building blocks shown in these views can be packed within said container in such interfitted relation as to fill the container to a plane flush with the top of the container without leaving any space between the blocks or between the blocks and the walls of the container, as will hereinafter be described. The container may be made of cardboard, plastic or other suitable sheet material and provided with a hinged lid 12 terminating at its free end in a flap 14 which can be inserted in the front of the container over the top layer of blocks.

As shown in FIG. 3, and also in FIG. 9, the basic blocks A, B, C, and D of a set of blocks may be sawed or otherwise cut into the desired lengths from an elongated bar 16 of rectangular cross-sectional shape, and made of wood, plastic or other suitable material, this bar having a thickness equal to one half its width and having a central longitudinal channel 18 of rectangular cross-sectional shape having a width equal to the thickness and a depth equal to one half the thickness of the bar, thereby forming parallel wall portions 20 equal in height to the depth of the channel 18 and equal in thickness to one half the width of the channel, so that any pair of channel wall portions 20 of blocks produced by cutting them from the bar 16, when placed in abutting relation, can be precisely interfitted within a channel of any other of the blocks, in parallel relation, irrespective of the length of the block, or whether it may be in two uniform triangular blocks placed together in rectangular plan formation. The uniform left and right triangular blocks A–1 shown in FIG. 4 may be produced by the diagonal cutting in two of the square block A along the broken line as shown in FIG. 3. The smaller triangular blocks B–1 may be produced by the diagonal cutting in two of the rectangular block B along the broken line as shown in FIG. 3. The triangular blocks D–1 shown in FIG. 23 may be produced by the diagonal cutting in two of the longer block D along the broken line as shown in FIG. 9. Said blocks may also be produced by initially cutting the bar 16 into the angular plan formations, or they may be cast or molded from suitable material.

In FIG. 6 is shown an auxiliary block E for interfitting relation within channel 18. This block is of rectangular cross-sectional shape with a width precisely equal to the width and a thickness equal to the depth of the channel 18, so that it can be precisely interfitted within the channel of either of the basic blocks of a set, and this particular block has a length equal to twice the width of the bar 16. A shorter block E–1 has the same cross-sectional shape and proportions, but it is only one half the length of the longer block E.

In FIG. 7, is shown another auxiliary block F of square cross-sectional shape, the length of the respective sides of which are equal to one half the width of block E, so that the two blocks in side by side relation will fill one one of the channels 18. The auxiliary block F–1 has the same cross-sectional shape and proportions as the block F, but is only one half its length.

Either of the blocks shown in FIG. 6 can be produced by cutting it at right angles from an elongated bar 16–1 and the blocks shown in FIG. 7 can be cut from a bar 16–2 in like manner.

The basic block C shown in FIG. 3 is formed with a second channel 18–1 opposite the longitudinal channel 18 and at right angles thereto; this channel having precisely the same shape and proportions as channel 18.

As previously mentioned, a set of modular blocks as shown in FIGS. 1 to 10 can be packed into the cubical container 10 in interfitted relation so that it will be precisely filled with the blocks to a plane flush with the top edge of the container without leaving any space between the blocks or between the blocks and the walls of the container, this being possible for the reason that the length of the longer blocks D, E and F is precisely equal to that of the respective inner walls of the container; and the length of the blocks A, A–1, C, E, and F–1 is equal to one half that of the respective inner walls of the container; and the length of the shorter blocks B and B–1 parallel with the channel 18 is precisely one half that of block A. Since the channeled basic blocks have a thickness equal to one fourth or a width equal to one half the depth of the container 10, a complete set of the blocks with the channels of the basic blocks filled with auxiliary blocks will precisely fill the container in various assemblies.

Obviously, basic and auxiliary blocks of the same cross-sectional shape and proportions in different sizes and lengths can be made to fit within cubical containers of larger or smaller dimensions or in oblong rectangular containers of different sizes and lengths by variations in the sizes and lengths of the blocks.

In the production of a pair of triangular blocks such, for example, as the elongated triangular blocks D–1, shown in FIG. 23, which may be produced by the diagonal cutting of the block D along the broken line, as indicated in FIG. 9, or produced by the initial cutting of the bar 16 obliquely and then cutting across their ends at right angles, the two triangular blocks are in right and left relation, so that when placing two of the blocks together with their wider ends in opposed relation, as shown in FIG. 23, two identical right or left blocks must be placed together to bring the channels 18 of the two blocks on the same side.

In FIG. 11 is shown a method of producing blocks G or H in oblique parallelogram plan formation, as shown in perspective in FIG. 12, and in plan in various assembled arrangements in FIGS. 18, 19, 21 and 22, and in cross-section on the line 20—20 of FIG. 18 in FIG. 20; also blocks in trapezoidal plan formation I as shown in perspective in FIG. 15; or in equilateral triangular plan formation J, as shown in perspective in FIG. 14, and in plan in FIG. 16, assembled in hexagonal formation. The triangular blocks may be cut in half along the broken line shown in FIG. 14 to form smaller triangular blocks J–1, as shown in perspective in FIG. 15 and in plan in FIG. 17. All the blocks G, H, I, J and J–1 may be produced by cutting them from the bar 16 across the channel 18 at the required angle for the different plan formations. The blocks G, H, I, J and J–1 correspond in end view, parallel with the channel 18, with that of the blocks A, A–1, B, B–1, C, D and D–1 in the interfitting relation, as shown in FIG. 8, irrespective of their different plan formations. However, the blocks G, H, I, J and J–1 are not designed for packing in the cubical container 10 in the same interfitting relation as described in connection with the blocks A, A–1, B, B–1, C, D and D–1.

As shown in FIGS. 18 and 20, the blocks G and H are of the same width as that of the channels 18 in the various other blocks, so that a pair of these blocks can be precisely interfitted within their channels 18, for example, to form oblique crosses as shown in FIG. 18. These blocks may also be assembled to form various other figures, such as those shown in FIGS. 19, 21 and 22.

In FIG. 23 is shown a pair of right blocks D–1 assembled with their wider ends in opposed relation, with the channels 18 on the same side. The smaller rectangular blocks B may be assembled in the same manner.

In FIG. 24 is shown a pair of the blocks B interfitted within their channels 18 in the form of a right angular cross, in the same manner as the interfitting relation of the blocks G and H of oblique plan formation.

In FIG. 25 is shown a pair of square or rectangular blocks, such as A, B, C or D assembled together to form a central square opening O. Any number of such blocks may be assembled or stacked together in vertically or horizontally coincidental alignment to form vertical stacks or horizontal structures of any height or length having the central square opening.

As previously mentioned, it is possible to make the channeled bar 16 by cementing square bars 20–a to each of the longitudinal margins of a flat bar 16–a, as indicated at 20–b in FIG. 8, to form the channel 18–a. Individual blocks may also be produced in the same manner.

The H block B–2 shown in FIGS. 26 and 27 corresponds to a pair of blocks B (FIG. 3) in the integral back to back formation with the wall portions 20 the same.

The block B–3 shown in FIG. 28 is similar to that of FIGS. 26 and 27 but with only one half its thickness and with the opposed channels 18 only one half the width of the channels 18, the central connecting portion or area being of square formation.

The block B–5 shown in FIG. 29 corresponds to that of FIG. 28 with the omission of wall portions 20 on one side.

The block B–6 shown in FIG. 30 is identical with that of FIG. 29 except with double width channel 18.

The block C–1 shown in FIG. 31 corresponds to block C (FIG. 3) except having single width channels 18.

The block B–7 shown in FIG. 32 corresponds to a pair of blocks B–6 (FIG. 30) in integral back to back relation, as indicated in broken lines, to form a square opening O.

FIG. 33 shows two pairs of blocks B–6 interfitted in the opening O of a block B–7, and also shows in broken lines how they can be likewise interfitted in the opening at right angles to those shown in full lines.

In FIG. 34 is shown a block B–8 having an H shape in plan identical with that of FIG. 28, but in which the central area is projected perpendicularly on each side of the block a distance equal to the width and height of the wall portions 20–1 to form axially aligned, square posts B–9 for insertion in corresponding openings in other blocks of a set, and providing opposed channels 18–2, which correspond in general to channels 18, of FIGS. 28, 29, 31 and 35. This block can be fabricated out of three of the square blocks F–1 (FIG. 7) by cementing one of those blocks to the other in perpendicular relation midway between their ends, as indicated at 20–C. It can also be molded in plastic or other suitable material. Or the component members may be pinned together.

FIG. 35 shows one of the blocks B–8 assembled between two of the blocks C–1 with the posts B–9 inserted in the square opening B–10 as shown more clearly in FIG. 36.

As previously mentioned, the block C–1 shown in FIG. 31 corresponds to block C (FIG. 3), except having single width channels 18–1, that is, the channels 18–1 being only the width of a single wall portion 20, instead of two of said wall portions. As shown in FIGS. 31, 35 and 36, the arrangement of the channels 18–1 on opposite sides of the blocks C–1 in right angular relation forms square central openings B–10, into which the square posts B–9 of block B–8 or any other square member of equal size may be inserted to align and maintain the blocks of various structures in firmly assembled relation. This also applies to block C (FIG. 3) since the arrangement of the opposed channels 18 and 18–1 also form central square openings of a larger area but otherwise corresponding to the openings B–10 of block C–1, in which case the interfitting square posts B–9, which project perpendicularly from the central areas of the face sides of the block will be of correspondingly larger cross-sectional size.

In FIGS. 2 and 10 are shown two modular structures formed by certain of the blocks described, and it is believed to be obvious that blocks of other plan formations, but having the same end or cross-sectional formations can be added to the structures as desired.

It is also believed to be obvious that blocks of various plan formations other than those shown may be produced within the spirit and scope of my invention. Therefore, it should be understood that the forms of my improved modular building blocks shown and described are intended to be illustrative, only, and restricted only by the appended claims.

I claim:

1. In a set of modular building blocks, a plurality of basic blocks of rectangular cross-sectional shape, all having central straight channels also of rectangular cross-sectional shape extending from end to end, said channels being of uniform depth and their side walls each having a width equal to said depth, and the width of each of said channels being equal to or double the width of each of said side walls; certain of the blocks in the set having said central channels on opposed sides of the block arranged in right angular relation thereby forming a central square through opening in said block.

2. A set of modular building blocks as in claim 1 in which certain of said blocks have said central channels on each side of the block arranged in parallel relation thereby forming the block in the shape of the letter U.

3. A set of modular building blocks as in claim 1 in which certain of said blocks have said central channels on each side of the block arranged in parallel relation thereby forming the block in the shape of the letter H, and also having a central square post projecting perpendicularly from each face side of the block for precise interfitting insertion in any of said central square openings of equal size.

4. A set of modular building blocks as in claim 1 in which each of said channels in said certain blocks is one half the width of the block, and the depth of said channels is one half the thickness of the block, so that said channel side walls of a pair of said blocks in abutting relation can be precisely interfitted within either one of said channels in parallel relation therewith and so that either one of said pair of blocks can be precisely interfitted edgewise within either of said channels of other said blocks.

5. A set of modular building blocks as in claim 1 in which certain of said blocks are of uniform square plan formation.

6. A set of modular building blocks as in claim 1 in which certain of the blocks are of triangular plan formation.

7. A set of modular building blocks as in claim 1 and including a plurality of auxiliary blocks of rectangular cross-sectional shape having a thickness equal to the depth of said channels and a width equal to that of certain of said channels.

8. A set of modular building blocks as in claim 1 in which certain of said blocks are of oblique parallelogram plan shape.

References Cited

UNITED STATES PATENTS

| | | | |
|---|---|---|---|
| 322,754 | 7/1885 | Schueller | 35—70 |
| 1,307,331 | 7/1919 | Christoph. | |
| 1,379,648 | 5/1921 | Niebel | 46—17 X |
| 1,736,134 | 11/1929 | Rutherford. | |
| 1,894,605 | 1/1933 | Wright | 46—25 |
| 2,278,327 | 3/1942 | Magnus et al. | 46—25 |
| 2,319,914 | 5/1943 | Blanding | 46—25 |

FOREIGN PATENTS

| | | |
|---|---|---|
| 1,004,227 | 3/1952 | France. |
| 1,004,941 | 4/1952 | France. |
| 1,179,276 | 5/1959 | France. |
| 71,148 | 1/1945 | Norway. |

F. BARRY SHAY, *Primary Examiner.*

U.S. Cl. X.R.

46—16

PO-1050
(5/69)

UNITED STATES PATENT OFFICE
CERTIFICATE OF CORRECTION

Patent No. 3,449,857          Dated June 17, 1969

Inventor(s) Eugene De Christopher

It is certified that error appears in the above-identified patent and that said Letters Patent are hereby corrected as shown below:

At the legend at the head of Column 1 delete "Assignor to Blackstone Corporation"

SIGNED AND
SEALED

OCT 28 1969

(SEAL)
Attest:

Edward M. Fletcher, Jr.
Attesting Officer

WILLIAM E. SCHUYLER, JR.
Commissioner of Patents